(12) United States Patent
Hwang

(10) Patent No.: US 7,296,588 B1
(45) Date of Patent: Nov. 20, 2007

(54) WATER FAUCET MOUNTED IN NARROW SPACE

(76) Inventor: Ren-Yih Hwang, 667, Sec. 2, Lu Ho Rd., Laio-Tsuo Li, Lu-Kang Chen, Changhua Hsien (TW)

( * ) Notice: Subject to any disclaimer, the term of this patent is extended or adjusted under 35 U.S.C. 154(b) by 584 days.

(21) Appl. No.: 10/914,317

(22) Filed: Aug. 9, 2004

(51) Int. Cl.
*F16K 11/074* (2006.01)
*E03C 1/04* (2006.01)

(52) U.S. Cl. .......................................... 137/359; 4/677

(58) Field of Classification Search ................ 137/359, 137/625.4, 625.41; 4/676, 677
See application file for complete search history.

(56) References Cited

U.S. PATENT DOCUMENTS

| | | | | |
|---|---|---|---|---|
| 1,948,971 A | * | 2/1934 | Meyer | ........................ 137/606 |
| 3,561,480 A | * | 2/1971 | Fairchild | .................. 137/625.4 |
| 4,998,555 A | * | 3/1991 | Barhydt et al. | ............. 137/359 |
| 5,010,922 A | * | 4/1991 | Agresta | ........................ 137/359 |
| 6,123,106 A | * | 9/2000 | Benstead | ..................... 137/801 |
| 6,918,400 B2 | * | 7/2005 | Buchner et al. | ......... 137/15.01 |
| 7,171,979 B1 | * | 2/2007 | Lai | ............................. 137/359 |

* cited by examiner

*Primary Examiner*—John Fox
(74) *Attorney, Agent, or Firm*—Alan Kamrath; Kamrath & Associates P.A.

(57) ABSTRACT

A water faucet includes a valve body, a valve seat, two water inlet pipes, a locking bolt, and a clamping member. Thus, the water faucet is mounted on the sink by the locking action between the clamping member, the locking bolt and the water inlet pipes, so that the water faucet is mounted on the sink easily and conveniently without having to mount the water faucet in a narrow space under the sink, thereby facilitating a user mounting the water faucet.

8 Claims, 7 Drawing Sheets

WATER FAUCET MOUNTED IN NARROW SPACE

BACKGROUND OF THE INVENTION

1. Field of the Invention

The present invention relates to a water faucet, and more particularly to a water faucet that can be mounted in a narrow space.

2. Description of the Related Art

A conventional water faucet mixes the cold water from the cold water pipe and the hot water from the hot water pipe, so that the mixed water flowing outward from the mixed water faucet has a proper temperature. However, when the conventional water faucet is mounted on a sink or a bath tub, a user has to screw a locking bolt in a narrow space under the sink or the bath tub, thereby causing inconvenience to the user when mounting the water faucet on the sink or the bath tub.

SUMMARY OF THE INVENTION

In accordance with one embodiment of the present invention, there is provided a water faucet, comprising:
a valve body having an inside formed with a valve chamber and an end face formed with a locking hole;
a valve seat mounted in the valve chamber of the valve body and having an inside formed with a water outlet hole connected to the locking hole of the valve body;
two water inlet pipes each mounted on the end face of the valve body;
a locking bolt rotatably mounted on the valve body and extended through and protruded outward from the locking hole of the valve body; and
a clamping member movably mounted on the locking bolt by rotation of the locking bolt and rested on and limited by the two water inlet pipes.

In accordance with another embodiment of the present invention, there is provided a water faucet, comprising:
a valve body having an inside formed with a valve chamber and an end face having two opposite sides provided with two water inlet seats each formed with a locking hole;
two water inlet pipes each mounted on a respective one of the water inlet seats of the valve body;
two locking bolts each rotatably mounted on the valve body and each extended through and protruded outward from the locking hole of a respective one of the water inlet seats of the valve body; and
two clamping members each movably mounted on a respective one of the locking bolts and each rested on and limited by a respective one of the water inlet pipes.

The primary objective of the present invention is to provide a water faucet that can be mounted in a narrow space, thereby facilitating a user mounting the water faucet.

Another objective of the present invention is to provide a water faucet that is mounted on the sink by the locking action between the clamping member, the locking bolt and the water inlet pipes, so that the water faucet is mounted on the sink easily and conveniently without having to mount the water faucet in a narrow space under the sink, thereby facilitating a user mounting the water faucet.

A further objective of the present invention is to provide a water faucet that is mounted on the batch tub by the locking action between the two clamping members, the two locking bolts and the two water inlet pipes, so that the water faucet is mounted on the batch tub easily and conveniently without having to mount the water faucet in a narrow space under the batch tub, thereby facilitating a user mounting the water faucet.

Further benefits and advantages of the present invention will become apparent after a careful reading of the detailed description with appropriate reference to the accompanying drawings.

DETAILED DESCRIPTION OF THE INVENTION

Figure 1:
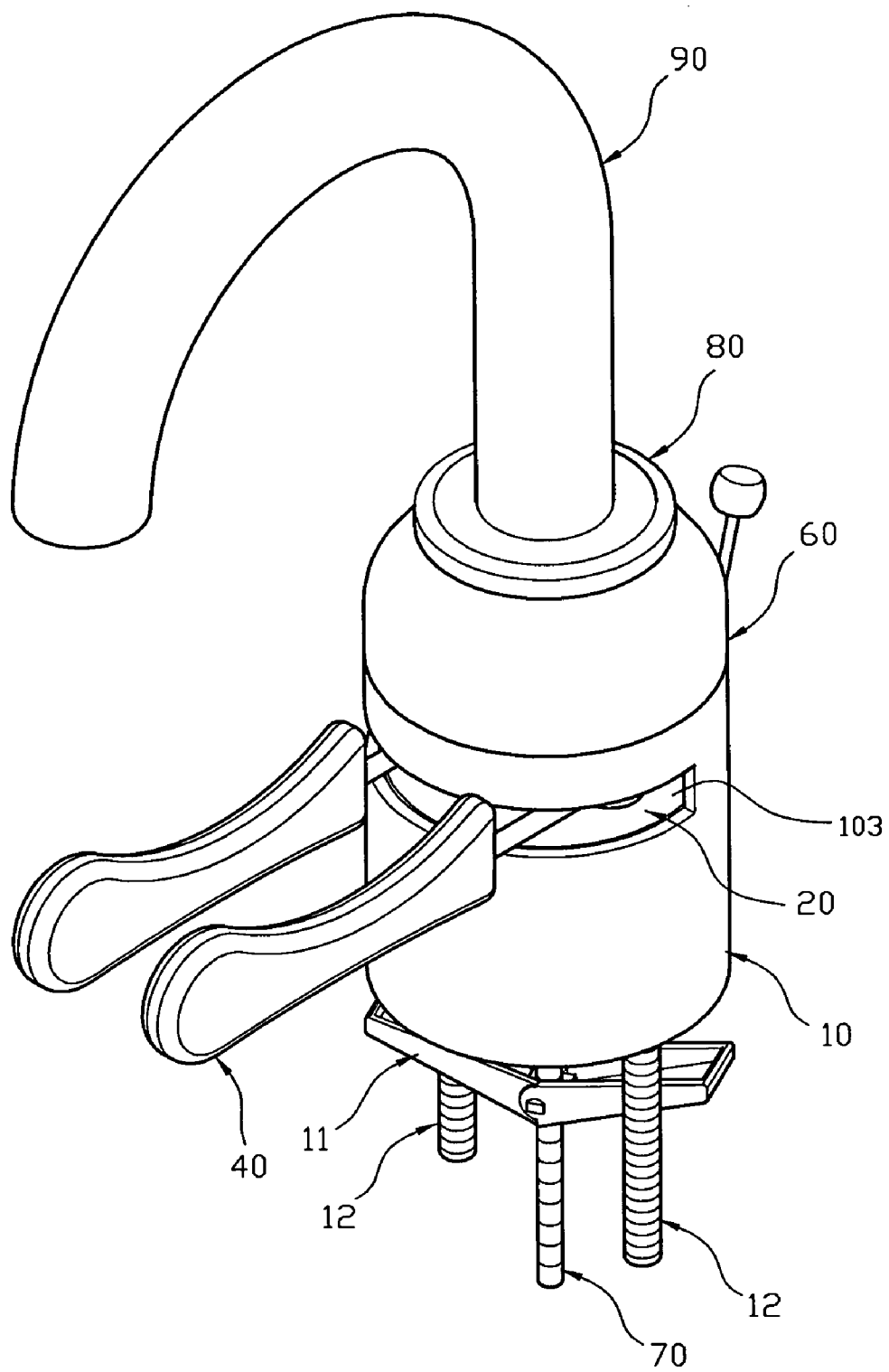
FIG. 1 is a perspective view of a water faucet in accordance with the preferred embodiment of the present invention.
Figure 2:
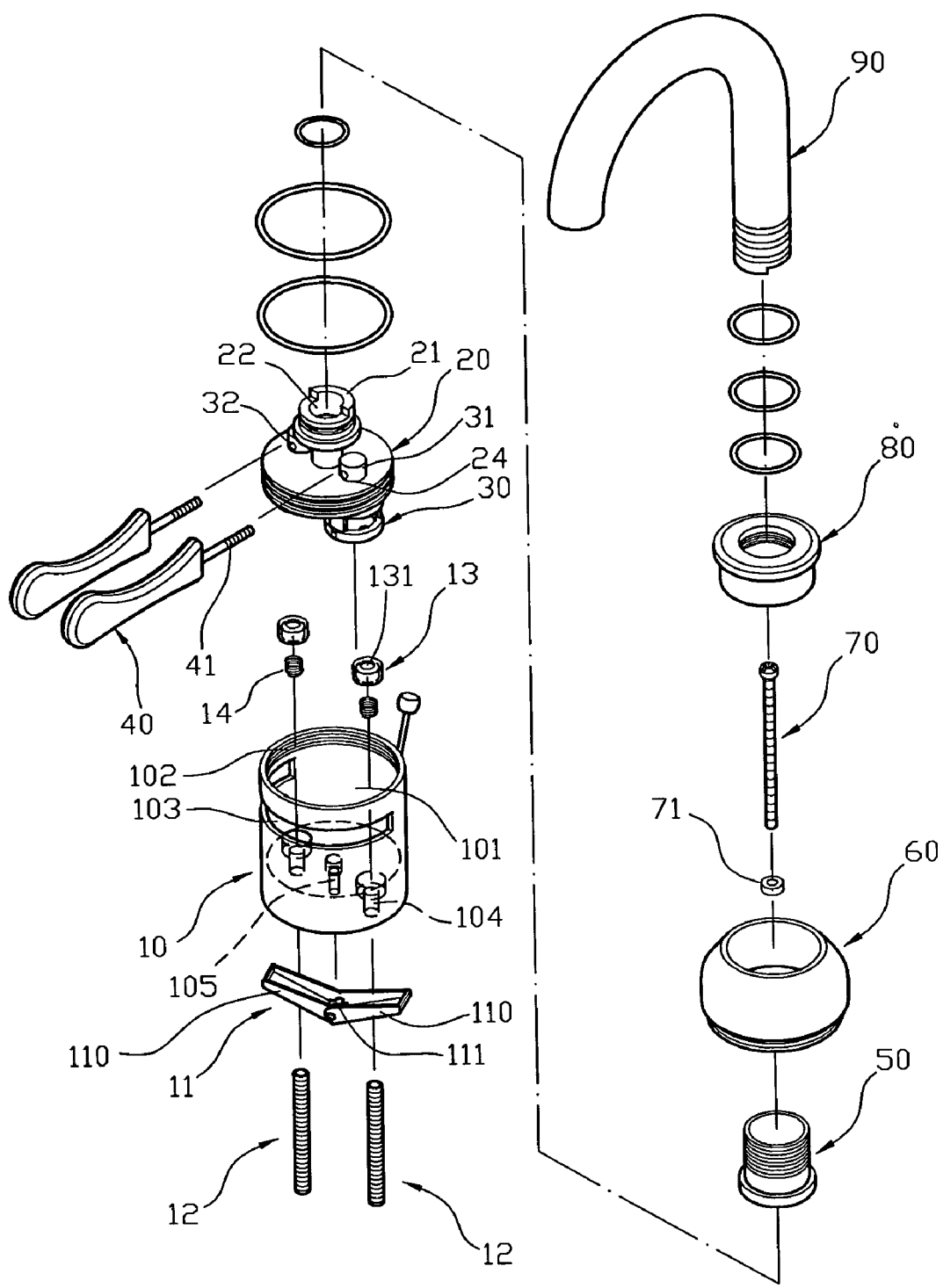
FIG. 2 is an exploded perspective view of the water faucet as shown in FIG. 1.
Figure 3:
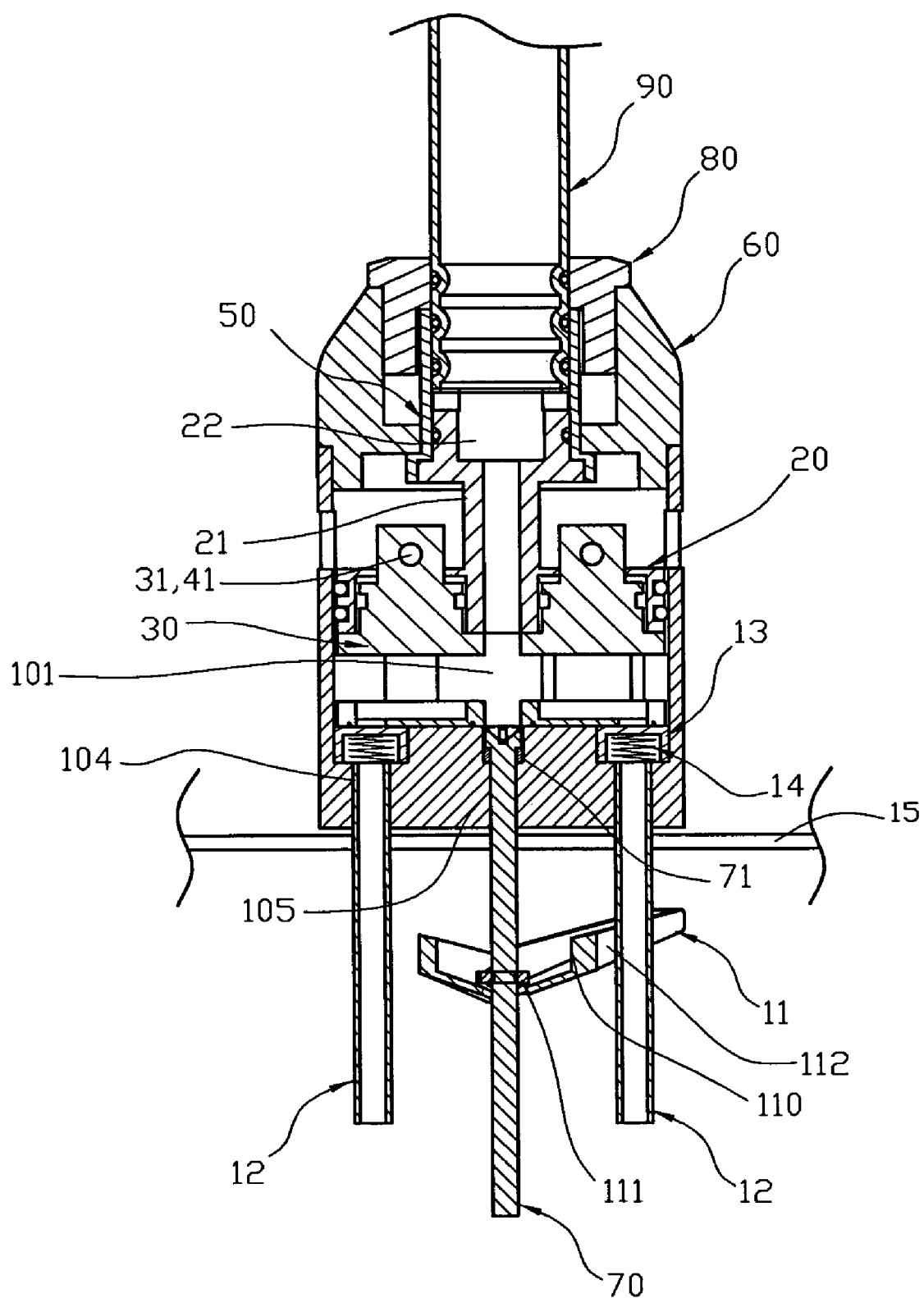
FIG. 3 is a partially cut-away plan cross-sectional view of the water faucet as shown in FIG. 1.
Figure 4:
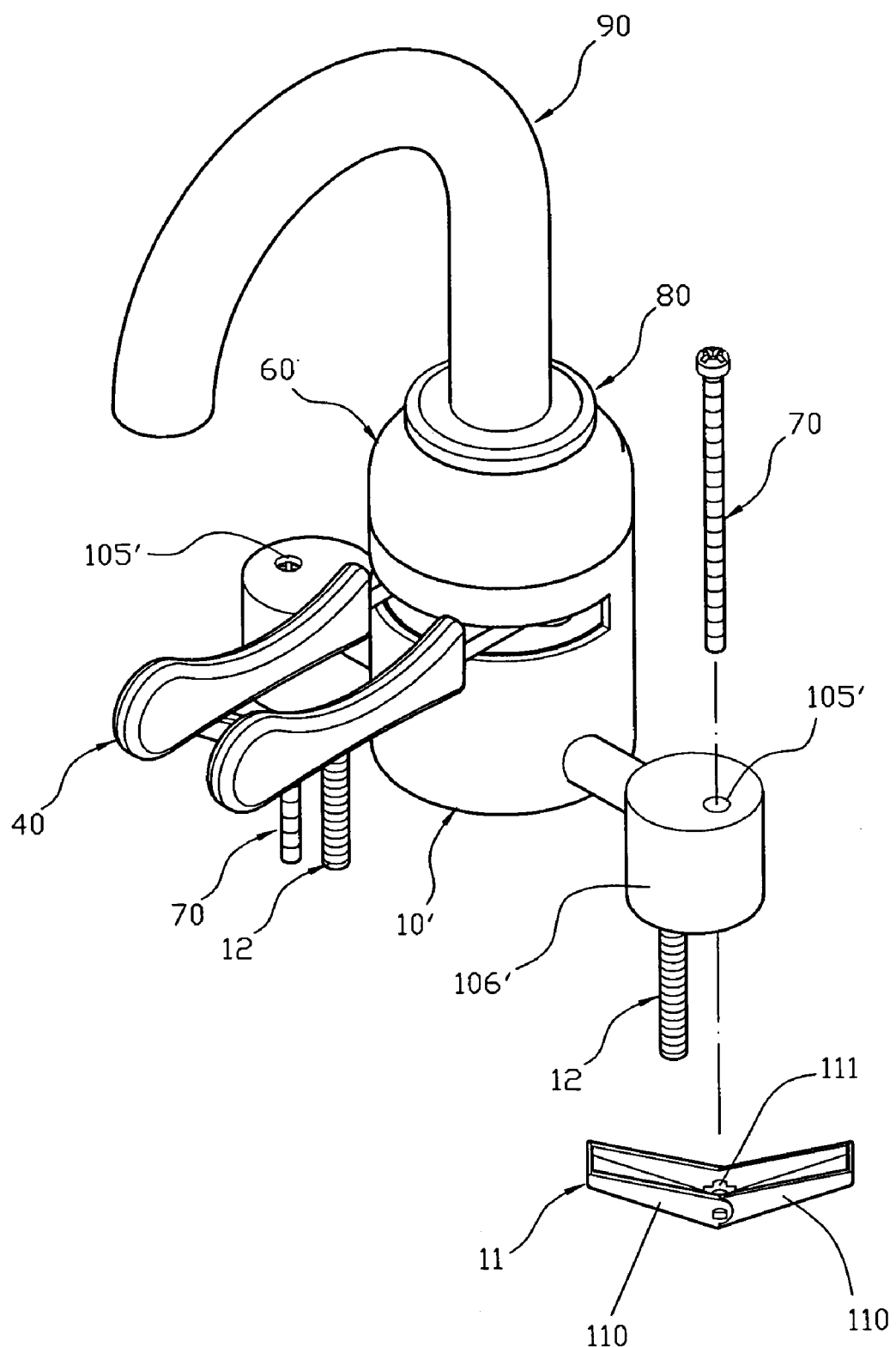
FIG. 4 is a partially exploded perspective view of a water faucet in accordance with another embodiment of the present invention.
Figure 5:
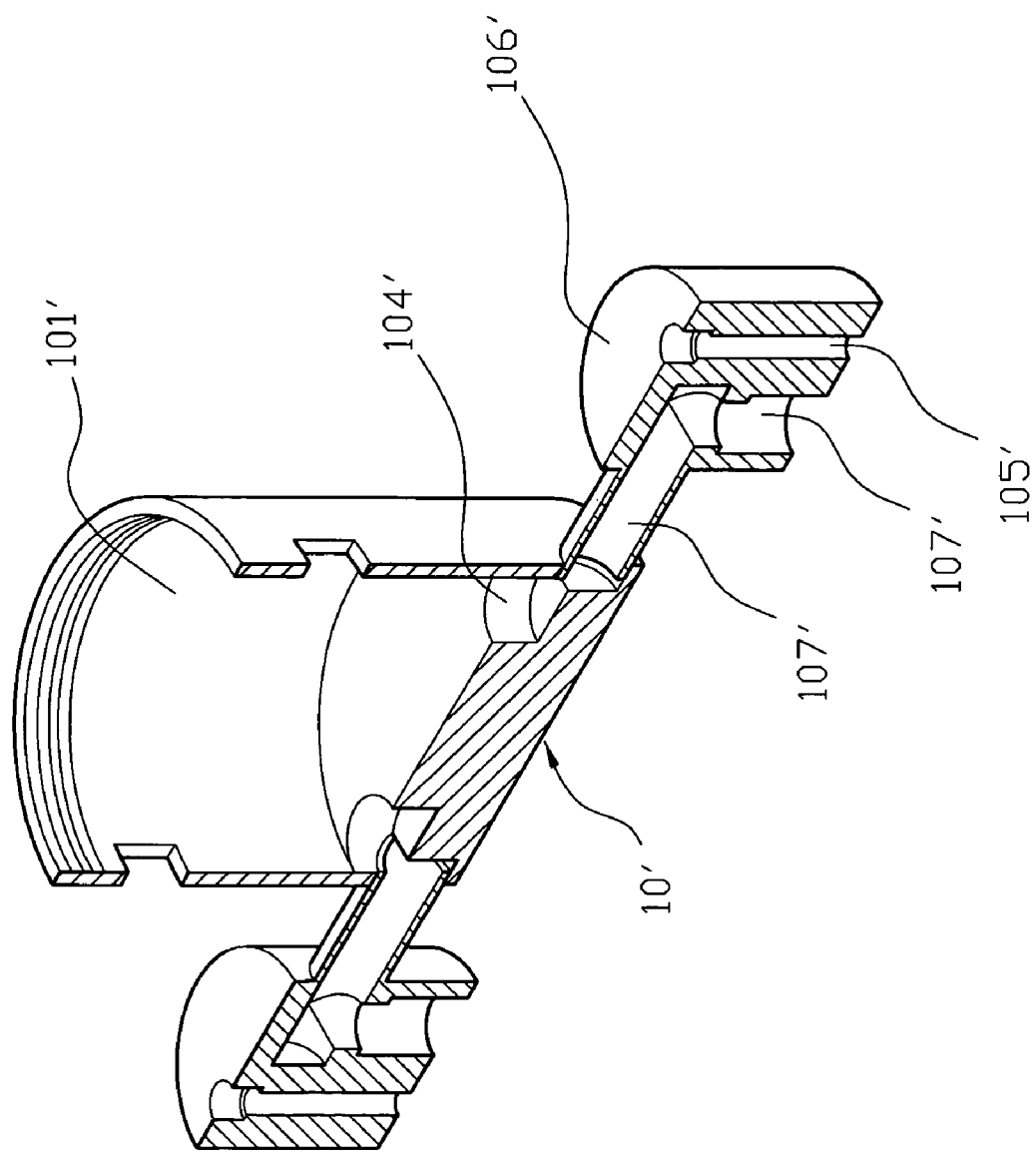
FIG. 5 is a perspective cross-sectional view of a valve body of the water faucet as shown in FIG. 4.
Figure 6:
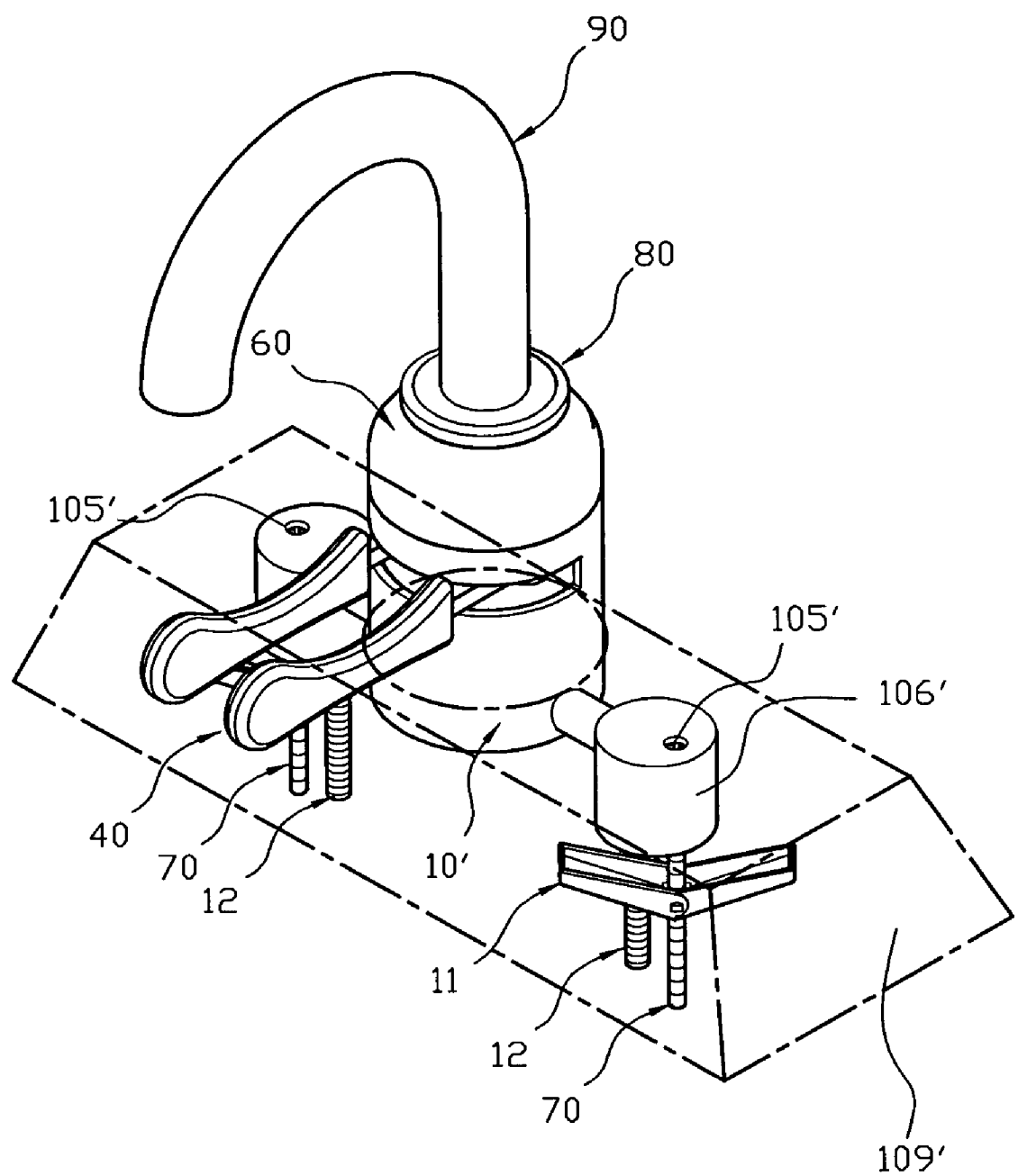
FIG. 6 is a perspective assembly view of the water faucet as shown in FIG. 4.
Figure 7:
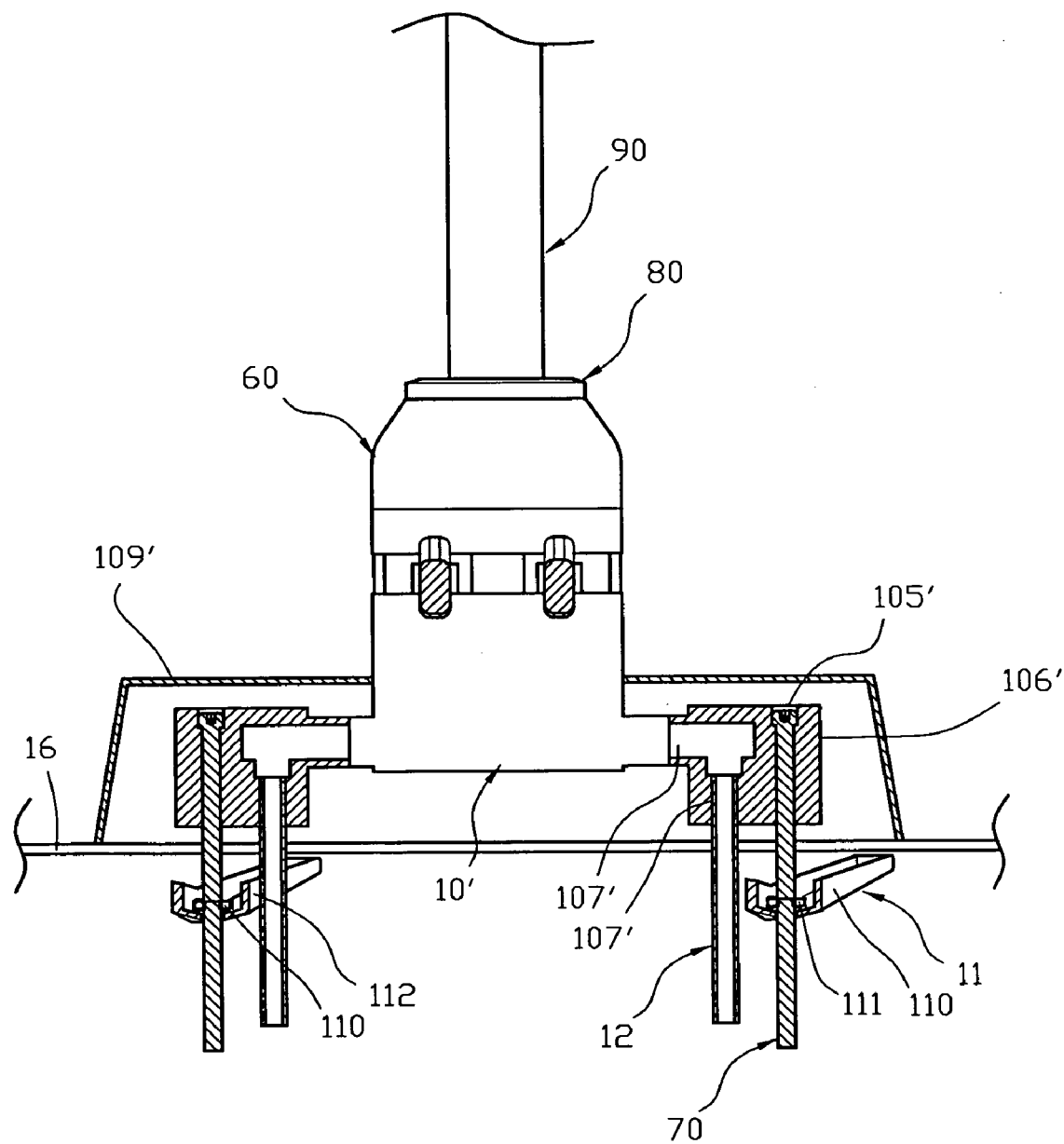
FIG. 7 is a partially cut-away plan cross-sectional view of the water faucet as shown in FIG. 6.

Referring to the drawings and initially to FIGS. 1-3, a water faucet in accordance with the preferred embodiment of the present invention comprises a valve body 10 having an inside formed with a valve chamber 101 and an end face formed with a locking hole 105, a valve seat 20 mounted in the valve chamber 101 of the valve body 10 and having an inside formed with a water outlet hole 22 connected to the locking hole 105 of the valve body 10, two water inlet pipes 12 each mounted on the end face of the valve body 10, a locking bolt 70 rotatably mounted on the valve body 10 and extended through and protruded outward from the locking hole 105 of the valve body 10, and a clamping member 11 movably mounted on the locking bolt 70 by rotation of the locking bolt 70 and rested on and limited by the two water inlet pipes 12.

The valve chamber 101 of the valve body 10 has an end formed with an inner thread 102. The end face of the valve body 10 is formed with two stepped water inlet holes 104, and each of the two water inlet pipes 12 has a first end inserted into a first portion of a respective one of the water inlet holes 104 of the valve body 10 and a second end connected to a hot water source (not shown) and a cold water source (not shown) respectively.

The water faucet further comprises two conducting members 13 each mounted in a second portion of a respective one of the water inlet holes 104 of the valve body 10 and each formed with a conducting hole 131 communicating with a respective one of the water inlet pipes 12, two elastic members 14 each mounted in a respective one of the water inlet holes 104 of the valve body 10 and each biased between the valve body 10 and a respective one of the conducting members 13, two control valves 30 each rotatably mounted on the valve seat 20 and each communicating with the valve chamber 101 of the valve body 10 and the conducting hole 131 of a respective one of the conducting members 13, and two control handles 40 each pivotally mounted on the valve body 10 and each having a distal end secured on a respective one of the two control valves 30 to rotate the two control valves 30.

The valve body 10 has a peripheral wall formed with a guide slot 103 to allow passage of two control handles 40. The valve seat 20 is formed with two pivot holes 24, each of the two control valves 30 has an end formed with a pivot shaft 31 pivotally mounted in a respective one of the two pivot holes 24 of the valve seat 20 and having a distal end formed with a screw bore 32, and the distal end of each of the two control handles 40 is formed with an outer thread 41 screwed into the screw bore 32 of the pivot shaft 31 of a respective one of the control valves 30 to rotate the two control valves 30.

The valve seat 20 has a side formed with a mounting seat 21. Preferably, the water outlet hole 22 of the valve seat 20 is connected to the valve chamber 101 of the valve body 10 and is in line with the locking hole 105 of the valve body 10.

The locking bolt 70 is extended through the water outlet hole 22 of the valve seat 20. A sealing ring 71 is mounted on the locking bolt 70 and received in the locking hole 105 of the valve body 10 to provide a leakproof effect.

The clamping member 11 includes a locking nut 111 movably mounted on the locking bolt 70 by rotation of the locking bolt 70, and two pivot hinges 110 each having a first end pivotally mounted on the locking nut 111 and a second end formed with a mounting hole 112 mounted on a respective one of the water inlet pipes 12.

The water faucet further comprises a water outlet pipe 90 mounted on the valve seat 20 and connected to the water outlet hole 22 of the valve seat 20, a threaded lower urging member 50 mounted on the mounting seat 21 of the valve seat 20 and rested on the water outlet pipe 90, a threaded outer urging member 60 screwed into the inner thread 102 of the valve body 10 and rested on the lower urging member 50, and a threaded upper urging member 80 mounted between the lower urging member 50 and the outer urging member 60 and urged on the water outlet pipe 90.

In assembly, the water faucet is mounted on a sink 15. Each of the water inlet pipes 12 is extended through the sink 15. Then, each of the pivot hinges 110 of the clamping member 11 is mounted on a respective one of the water inlet pipes 12. Then, the locking bolt 70 is extended through the water outlet hole 22 of the valve seat 20 and the locking hole 105 of the valve body 10 and is screwed into the locking nut 111. In such a manner, when the locking bolt 70 is rotated by a screwdriver, the locking nut 111 is moved upward on the locking bolt 70 to push the first end of each the pivot hinges 110 of the clamping member 11 to move upward. At this time, the second end of each of the pivot hinges 110 of the clamping member 11 is limited by a respective one of the water inlet pipes 12, so that the pivot hinges 110 of the clamping member 11 are expanded outward in a horizontal manner to lock the valve body 10 on the sink 15. Finally, the water outlet pipe 90 is mounted on the valve seat 20 and the upper urging member 80 is mounted between the lower urging member 50 and the outer urging member 60. Thus, the water faucet is mounted on the sink 15 by the locking action between the clamping member 11, the locking bolt 70 and the water inlet pipes 12.

Referring to FIGS. 4-7, a water faucet in accordance with another embodiment of the present invention comprises a valve body 10' having an inside formed with a valve chamber 101' and an end face having two opposite sides provided with two substantially inverted L-shaped water inlet seats 106' each formed with a locking hole 105', two water inlet pipes 12 each mounted on a respective one of the water inlet seats 106' of the valve body 10', two locking bolts 70 each rotatably mounted on the valve body 10' and each extended through and protruded outward from the locking hole 105' of a respective one of the water inlet seats 106' of the valve body 10', and two clamping members 11 each movably mounted on a respective one of the locking bolts 70 and each rested on and limited by a respective one of the water inlet pipes 12.

The end face of the valve body 10' is formed with two water inlet holes 104' each communicating with the valve chamber 101' of the valve body 10'. Each of the water inlet seats 106' of the valve body 10' is formed with a substantially inverted L-shaped water inlet channel 107' having a first portion communicating with a respective one of the water inlet holes 104' and a second end mounted on a respective one of the water inlet pipes 12. A cover 190' is mounted on the valve body 10' to cover the water inlet seats 106A'.

In assembly, the water faucet is mounted on a batch tub 16. Each of the water inlet pipes 12 is extended through the batch tub 16. Then, the pivot hinge 1 10 of each of the clamping members 11 is mounted on a respective one of the water inlet pipes 12. Then, the locking bolt 70 is extended through the locking hole 105' of a respective one of the water inlet seats 106' of the valve body 10' and is screwed into the locking nut 111' of a respective one of the clamping members 11. In such a manner, when each of the locking bolts 70 is rotated by a screwdriver, the locking nut 111' of each of the clamping members 11 is moved upward on the respective locking bolt 70 to push the first end of the pivot hinge 110 of the respective clamping member 11 to move upward. At this time, the second end of each of the pivot hinge 110 of each of the clamping members 11 is limited by a respective one of the water inlet pipes 12, so that the pivot hinges 110 of the clamping members 11 are expanded outward to lock the valve body 10' on the batch tub 16. Thus, the water faucet is mounted on the batch tub 16 by the locking action between the two clamping members 11, the two locking bolts 70 and the two water inlet pipes 12.

Accordingly, the water faucet is mounted on the sink 15 by the locking action between the clamping member 11, the locking bolt 70 and the water inlet pipes 12, so that the water faucet is mounted on the sink 15 easily and conveniently without having to mount the water faucet in a narrow space under the sink 15, thereby facilitating a user mounting the water faucet. In addition, the water faucet is mounted on the batch tub 16 by the locking action between the two clamping members 11, the two locking bolts 70 and the two water inlet pipes 12, so that the water faucet is mounted on the batch tub 16 easily and conveniently without having to mount the water faucet in a narrow space under the batch tub 16, thereby facilitating a user mounting the water faucet.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A water faucet, comprising:
   a valve body having an inside formed with a valve chamber and an end face formed with a locking hole;

a valve seat mounted in the valve chamber of the valve body and having an inside formed with a water outlet hole connected to the locking hole of the valve body;

two water inlet pipes each mounted on the end face of the valve body;

a locking bolt rotatably mounted on the valve body and extended through and protruded outward from the locking hole of the valve body; and a clamping member movably mounted on the locking bolt by rotation of the locking bolt and rested on and limited by the two water inlet pipes.

2. The water faucet in accordance with claim 1, wherein the clamping member includes a locking nut movably mounted on the locking bolt by rotation of the locking bolt, and two pivot hinges each having a first end pivotally mounted on the locking nut and a second end formed with a mounting hole mounted on a respective one of the water inlet pipes.

3. The water faucet in accordance with claim 1, wherein the water outlet hole of the valve seat is connected to the valve chamber of the valve body.

4. The water faucet in accordance with claim 1, wherein the water outlet hole of the valve seat is in line with the locking hole of the valve body.

5. The water faucet in accordance with claim 1, wherein the locking bolt is extended through the water outlet hole of the valve seat.

6. The water faucet in accordance with claim 1, further comprising a sealing ring mounted on the locking bolt and received in the locking hole of the valve body.

7. The water faucet in accordance with claim 1, wherein the end face of the valve body is formed with two stepped water inlet holes, and each of the two water inlet pipes has an end inserted into a first portion of a respective one of the water inlet holes of the valve body.

8. The water faucet in accordance with claim 1, further comprising a water outlet pipe mounted on the valve seat and connected to the water outlet hole of the valve seat, a threaded lower urging member mounted on the mounting seat of the valve seat and rested on the water outlet pipe, a threaded outer urging member screwed into the inner thread of the valve body and rested on the lower urging member, and a threaded upper urging member mounted between the lower urging member and the outer urging member and urged on the water outlet pipe.

* * * * *